US012350842B2

(12) United States Patent
Greenberg et al.

(10) Patent No.: US 12,350,842 B2
(45) Date of Patent: Jul. 8, 2025

(54) COLLABORATIVE ROBOTIC SYSTEM

(71) Applicant: Southwest Research Institute, San Antonio, TX (US)

(72) Inventors: Benjamin R. Greenberg, San Antonio, TX (US); Brian C. Swenson, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 266 days.

(21) Appl. No.: 17/832,386

(22) Filed: Jun. 3, 2022

(65) Prior Publication Data

US 2023/0390932 A1    Dec. 7, 2023

(51) Int. Cl.
*B25J 9/16* (2006.01)
*B25J 13/08* (2006.01)

(52) U.S. Cl.
CPC .......... *B25J 9/1676* (2013.01); *B25J 9/1697* (2013.01); *B25J 13/08* (2013.01)

(58) Field of Classification Search
CPC ........ B25J 9/1676; B25J 9/1697; B25J 13/08; B25J 9/1666; G05B 2219/40202; G05B 2219/40476; G05B 2219/40607
See application file for complete search history.

(56) References Cited

U.S. PATENT DOCUMENTS

| | | | | |
|---|---|---|---|---|
| 10,675,766 B1* | 6/2020 | Niemeyer | .............. | B25J 13/025 |
| 10,899,017 B1* | 1/2021 | De Sapio | ............... | B25J 11/008 |
| 11,919,173 B2* | 3/2024 | Denenberg | ............. | B25J 9/1666 |
| 2009/0118863 A1* | 5/2009 | Dariush | ................. | G06N 3/004 |
| | | | | 901/50 |
| 2016/0023352 A1* | 1/2016 | Kennedy | ................ | B25J 9/0087 |
| | | | | 901/30 |
| 2017/0173795 A1* | 6/2017 | Tan | ........................ | B25J 9/1661 |
| 2018/0099408 A1* | 4/2018 | Shibata | ................. | B25J 9/1697 |
| 2019/0134819 A1* | 5/2019 | Okahara | ............... | B25J 13/088 |
| 2020/0086487 A1* | 3/2020 | Johnson | ................ | B25J 9/1664 |
| 2021/0206003 A1* | 7/2021 | Zhou | ..................... | G05D 1/243 |
| 2021/0309264 A1* | 10/2021 | Felip Leon | ........... | B25J 9/1666 |
| 2022/0241974 A1* | 8/2022 | Mishima | ............... | B25J 9/1676 |
| 2022/0315355 A1* | 10/2022 | Sun | .......................... | B25J 9/163 |
| 2022/0379474 A1* | 12/2022 | Vu | .......................... | G01S 17/87 |
| 2023/0233105 A1* | 7/2023 | Chen | ........................ | G06N 3/08 |
| | | | | 702/94 |
| 2023/0294277 A1* | 9/2023 | Yang | .................. | G05B 19/4155 |
| | | | | 700/217 |

(Continued)

OTHER PUBLICATIONS

Bruce, Real-Time Motion Planning and Safe Navigation in Dynamic Multi-Robot Environments, School of Computer Science Carnegie Mellon University, Dec. 15, 2006, pp. 1-204 (Year: 2006).*

(Continued)

*Primary Examiner* — Sze-Hon Kong
(74) *Attorney, Agent, or Firm* — Verrill Dana, LLP

(57) ABSTRACT

A robotic system to facilitate simultaneous human laborer and robotic tasks on an article. The system includes data acquisition from a non-point cloud camera and implementation by a mid-tier consumer grade workstation. Nevertheless, a motion plan may be carried out by the robotic aid in a manner that allows for "on-the-fly" adjustment to a second motion plan to avoid collision with the laborer during the performed tasks.

15 Claims, 5 Drawing Sheets

(56) References Cited

U.S. PATENT DOCUMENTS

| | | | |
|---|---|---|---|
| 2023/0298257 A1* | 9/2023 | Gautron | G06T 15/005 |
| | | | 345/426 |
| 2023/0347522 A1* | 11/2023 | Wollstadt | G06F 3/015 |
| 2023/0364792 A1* | 11/2023 | Takano | B25J 9/1664 |
| 2023/0373092 A1* | 11/2023 | Zoghlami | G01S 13/881 |
| 2023/0381959 A1* | 11/2023 | Thomaz | B25J 9/163 |
| 2023/0410430 A1* | 12/2023 | Kutsyy | G06T 17/205 |
| 2024/0083027 A1* | 3/2024 | Spampinato | B25J 9/1664 |
| 2024/0083031 A1* | 3/2024 | Falco | B25J 9/1674 |
| 2024/0308071 A1* | 9/2024 | Zhang | B25J 9/1666 |
| 2024/0424678 A1* | 12/2024 | Vu | G01S 17/87 |

OTHER PUBLICATIONS

Matheson et al., Human-Robot Collaboration in Manufacturing Applications: A Review, Robotics Dec. 6, 2019, pp. 1-25 (Year: 2019).*

Cherubini et al., Collaborative manufacturing with physical human-robot interaction, Robotics and Computer-Integrated Manufacturing, 2016, pp. 1-13 (Year: 2016).*

Chen et al., Review of Low Frame Rate Effects on Human Performance, IEEE Transactions on Systems, Man, and Cybernetics—Part A: Systems and Humans, vol. 37, No. 6, Nov. 2007, pp. 1063-1076 (Year: 2007).*

Fan et al., Vision-based holistic scene understanding towards proactive human-robot collaboration, Jan. 10, 2022, Robotics and Computer-Integrated Manufacturing 75, pp. 1-17 (Year: 2022).*

* cited by examiner

COLLABORATIVE ROBOTIC SYSTEM

BACKGROUND

Over the years, industrial applications that involve manual labor have increasingly taken advantage of robotic aids. On the assembly line and in various other types of manufacturing both manual labor and robotic arms or other robotic tools are utilized in attaining a finished article of manufacture.

Of course, with the use of robotic aids in conjunction with manual labor, certain precautions are necessary. For example, as a matter of safety in a manufacturing facility, robotic tasks may be performed in an isolated area or caged off from tasks that involve direct human manipulation. Thus, human laborers may be kept safely away from a swinging robotic arm or other heavy, load bearing implement as robotic tasks are performed.

Keeping the robotic equipment and human laborer away from one another may be sufficient to ensure safety in the workplace. Unfortunately, this means that the manufacturing process may be more time consuming and inefficient with the laborer unable to begin work on the article of manufacture until the robotic task has been completed, or vice versa.

In an effort to make the manufacturing process more efficient, collaborative robotic aids have been developed that might allow for the laborer to perform tasks on the article of manufacture simultaneous with the robotic aid performing tasks on the same article. However, in order for this simultaneous human-robot task to be undertaken, other precautions are taken. For example, the robot may be limited in speed, payload and types of tasks which may be allowed. These precautions not only require limiting robotic tasks but they also do not fully eliminate the hazards involved. That is, conventional collaborative robotic aids are still prone to unintentionally harm the laborer when accidentally bumping into the laborer. It is just that this accidental bumping is less likely to result in serious long-term injury or death to the laborer.

Alternatively, safety across a manufacturing facility could be improved through other means apart from utilizing a collaborative robot that is limited in terms of payloads, speeds and so forth. For example, the possibility of utilizing a plurality of stereo cameras, LIDAR equipment, 3D depth data packet capable acquisition systems or other means of real-time data tracking and acquisition could be combined with high-performance industrial computing. However, when considering that the conventional manufacturing facility may involve ten or more laborers, multiple robots and 5-10,000 square feet of floorspace to monitor, this type of collaborative system may cost in excess of $100,000 in equipment alone. Additional costs in the form of system installation, maintenance and upgrades over time can render such a system impractical With these issues in mind, operators are generally left with the option of installing a truly cost prohibitive system for sake of safety and efficiency, or to simply utilize a limited robot system. As a result, operators often opt for a robotic aid in the form of a limited collaborative robot operating at minimal speeds and loads or one that is truly segregated from human laborers within the facility. The option of an affordable, efficient and truly collaborative robotic system that may be utilized simultaneous with laborers without limitation remains unavailable.

SUMMARY

A robotic assembly is disclosed herein for collaborative operation with a human at a worksite. The assembly includes at least one camera for the acquisition of visual data at the site and a movable implement to facilitate a first task at the site. The first task proceeds according to a first motion plan which is different from a second task facilitated by the human at the site. Further, a mid-tier consumer grade processor is provided to direct the implement according to the first motion plan and to attain the visual data in real-time. Thus, the processor is configured to develop and adjust an adoptable second motion plan for the first task during the directing and the attaining based on human positioning during the tasks.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to a particular workspace utilizing a collaborative robotic assembly in cooperation with one or more human laborers focused on manufacturing small articles. For example, mobile device components and devices may be assembled at the worksite through embodiments of collaborative robotic assemblies detailed herein. However, other types of collaborative operations may take advantage of embodiments described herein. For example, larger car frame assemblies or pick and place systems may utilize such systems. So long as the collaborative robotic assembly is capable of performing tasks through adjustable motion plans implemented through limited data processed through a mid-tier consumer grade processor, appreciable benefit may be realized.

Figure 1:
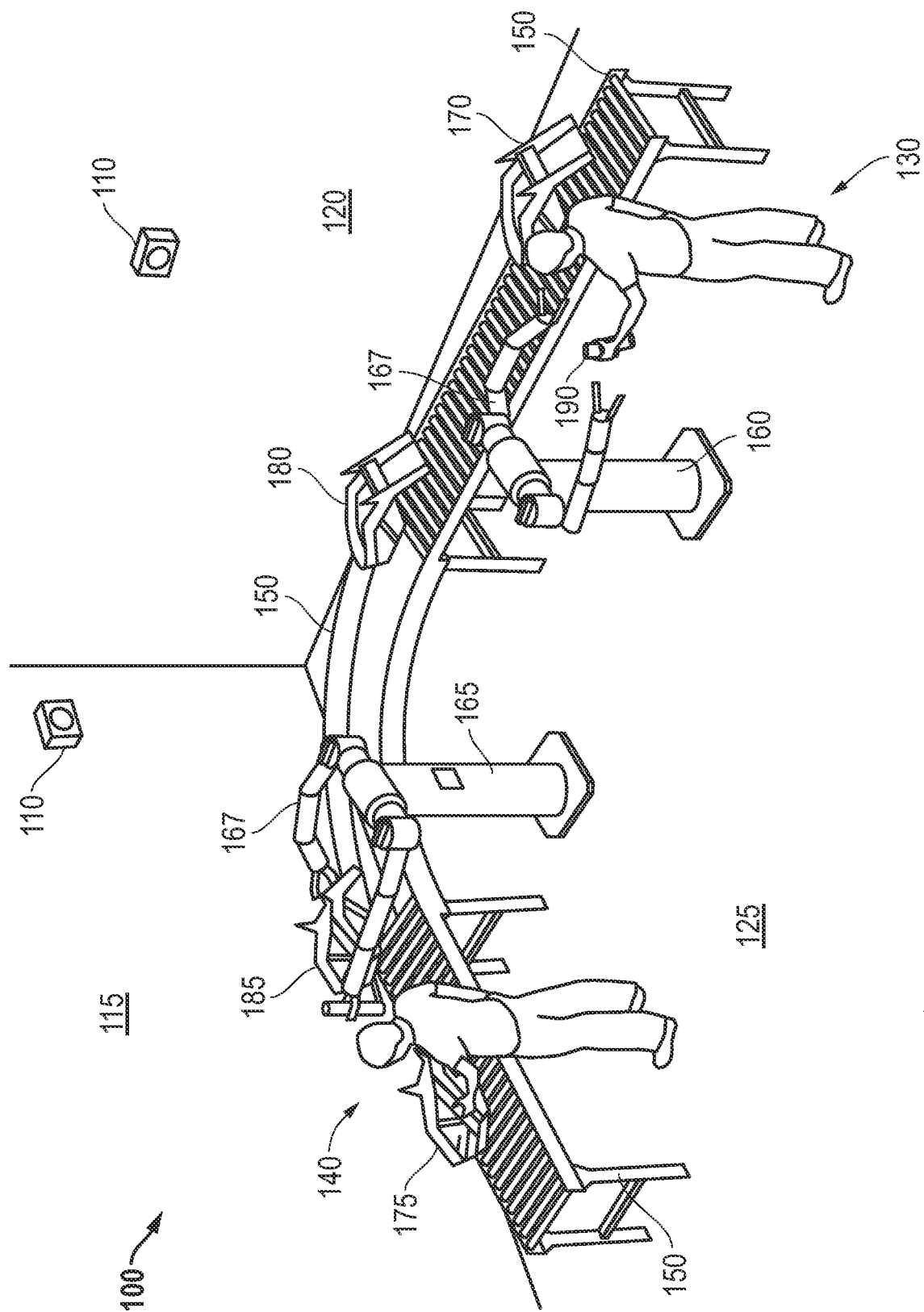
FIG. 1 is a perspective overview of an embodiment of a collaborative robotic assembly at a worksite with human laborers.

Referring now to FIG. 1, a perspective overview of an embodiment of a collaborative robotic assembly 100 is shown at a worksite 125 with human laborers 130, 140. In the embodiment shown, the worksite 125 includes a room with walls 115, 120 where conventional cameras 110 may be mounted for motion capture. Of course, other mounting locations, including a ceiling, may be suitable. As used herein, a conventional camera 110 may include a sensor and is a camera that is of 2D or 3D capability that is not configured to transmit depth. These may be referred to as non-point cloud cameras 110 which are generally economical yet capable of sufficiently monitoring and acquiring human joint position data as detailed further below.

Continuing with reference to FIG. 1, the worksite 125 illustrated includes an assembly conveyor 150 where articles 190 are moved between human laborers 130, 140 and robotic aids 160, 165 for processing and/or assembly. As illustrated, each laborer 130, 140 and each robotic aid 160, 165 is positioned at a dedicated station where a specific finishing tool 175, 185, 180, 170 is utilized. Further, in the embodiment shown, the laborers 130, 140 and robotic aids 160, 165 generally manipulate each article 190 independent of one another. However, embodiments detailed herein also help facilitate circumstances in which both human 130, 140 and robotic 160, 165 manipulation may safely occur simultaneously (see FIG. 3).

Figure 3:
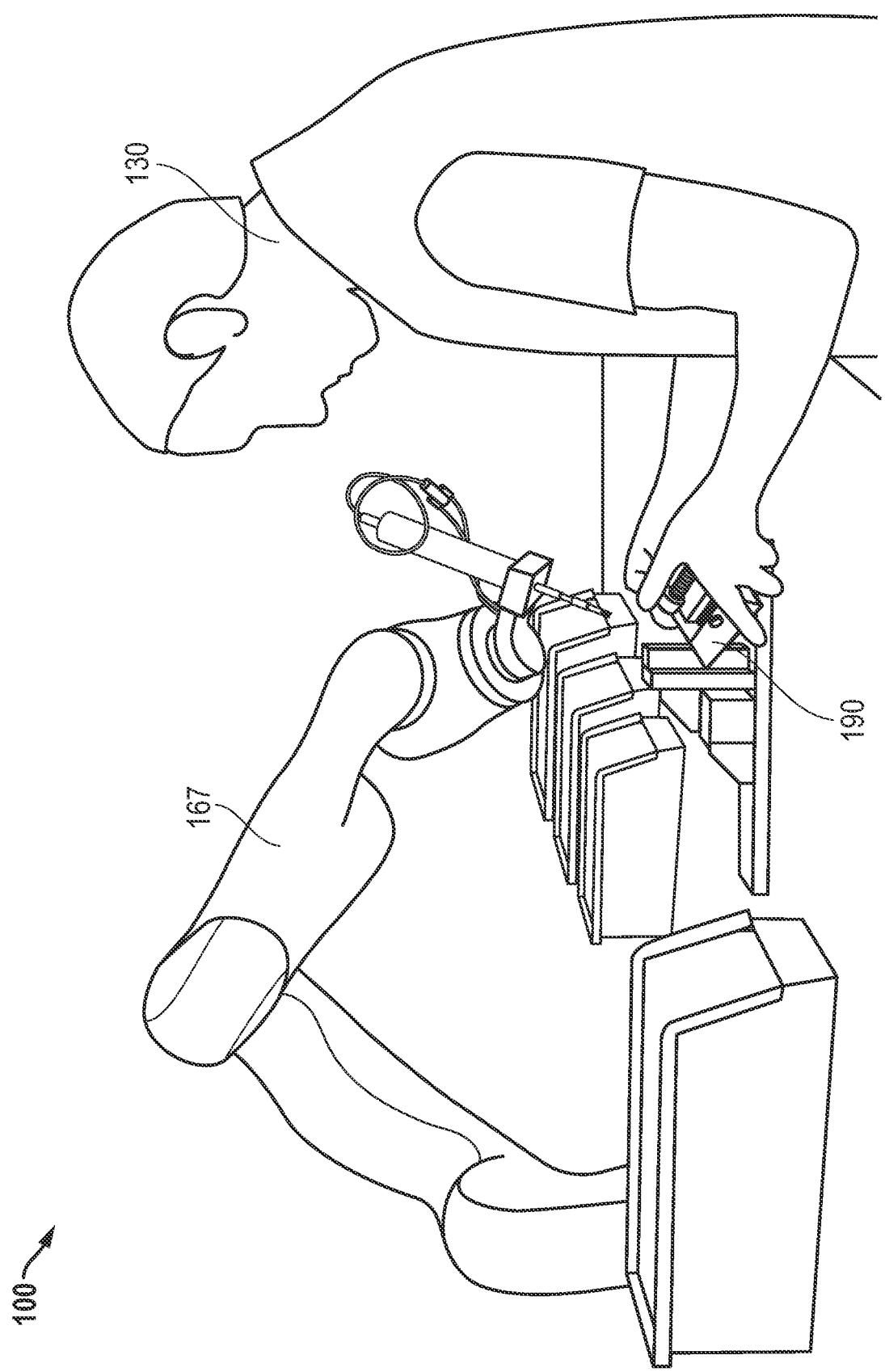
FIG. 3 is a side perspective view of a laborer collaborating with the robotic assembly on an article.

In the embodiment shown, the robotic aids 160, 165 are shown in an immobile configuration at a dedicated location. However, it is worth pointing out that the embodiments of the system herein are such that the aids 160, 165 may be more mobile and not necessarily immobilized at a given location of the facility floor. Nevertheless, truly collaborative robotic assistance may be available to the laborers 130, 140 without undue concern over a robotic implement 167 or arm striking a laborer 130, 140. No fencing off of the robotic aids 160, 165 for sake of safety is required. This remains true even for circumstances where a robotic aid 160, 165 and a laborer 130, 140 may manipulate the same article 190 at the same point in time (again, as illustrated in FIG. 3). In this way, the speed, strength and reliability of robotic aids 160, 165 may be taken advantage of in simultaneous fashion with the critical thinking, dexterity and dynamic problem solving of the working laborer 130, 140 in a seamless co-working manner. Further, this level of safety is achieved in an economical manner wherein the robotic aids 160, 165 move in accordance with a first motion plan that may be adjusted to a second motion plan as detailed further below as opposed to requiring the expense of LIDAR, point cloud or other more costly equipment.

Figure 2B:
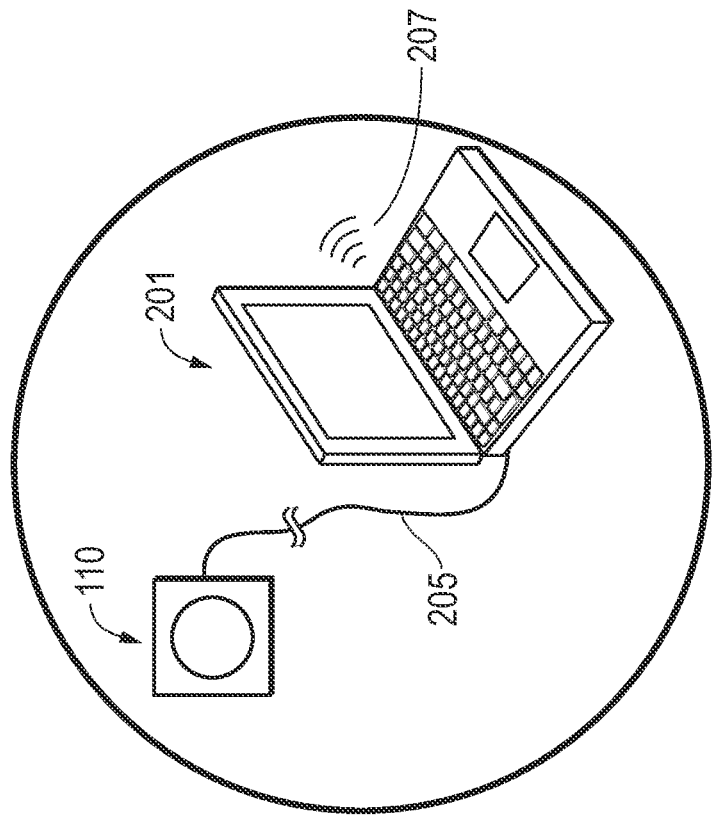
FIG. 2B is a perspective schematic view of an embodiment of a mid-tier workstation coupled to a camera of the assembly of FIG. 1.
Figure 2A:
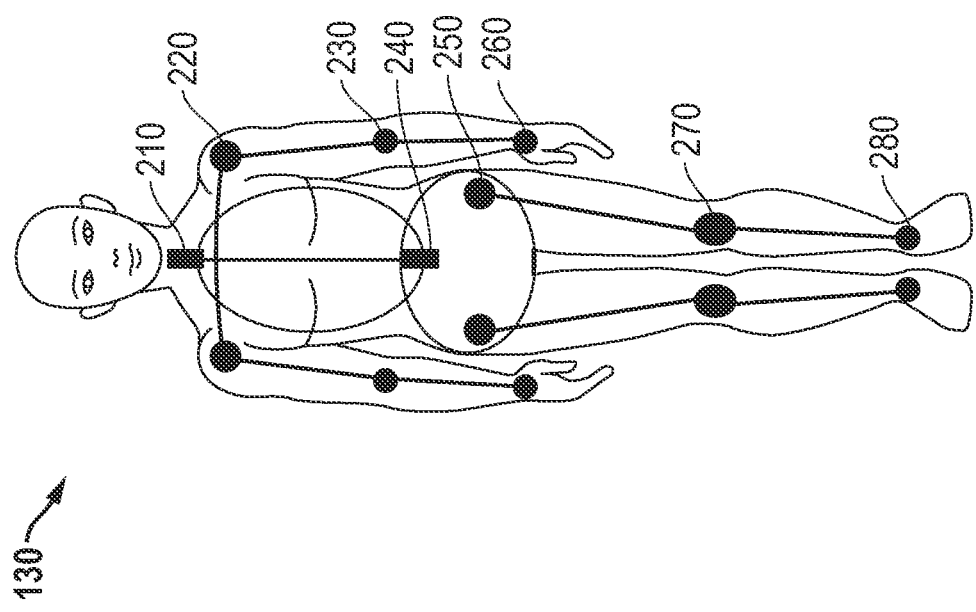
FIG. 2A is a front schematic view of a human laborer of FIG. 1 highlighting estimated joint locations.

Referring now to FIG. 2A, a front schematic view of a human laborer 130 of FIG. 1 is shown highlighting estimated joint locations 210, 220, 230, 240, 250, 260, 270, 280. With added reference to FIG. 2B, these locations 210-280 may be estimated by a processor of a workstation 201 with data collected from a camera 110. These estimations may be enhanced by the use of multiple cameras 110 for sake of depth information as illustrated in FIG. 1 and/or the use of sensors. In one embodiment, processor execution is enhanced by prestored joint location information available from prior testing and analysis of the laborer 130 which may include sensors at the locations 210-280.

Referring now to FIG. 2B, a perspective schematic view of an embodiment of a mid-tier workstation 201 is shown coupled to a camera 110 of the assembly 100 of FIG. 1. For sake of illustration, the camera 110 is shown wired to the workstation 201 by a communication line 205 to collect substantially real-time or live joint location data as noted above. However, various forms of wireless communications may also be employed. Regardless, with this joint location data available, the workstation 201 may transmit a motion plan to the robotic assemblies 160, 165 of FIG. 1 (see wireless transmission 207). This plan may initially be tailored to the tasks to be performed by the robotic assemblies 160, 165. However, the plan may also be considered adjustable based on the available joint location data for laborers 130, 140 as shown in FIG. 1. That is, as detailed below, the plan may be a first plan that is adjusted to a second plan based on the collected joint location data. Stated another way, while the first motion plan is directed at the robotic task, the adjustment to a second motion plan may be directed at avoiding contact with laborers 130, 140 of FIG. 1.

Continuing with reference to FIGS. 2A and 2B, the workstation 201 is a mid-tier consumer grade workstation. For example, a laptop or other readily available workstation may be sufficient. Indeed, a processor operating with less than about 10 computing cores and/or less than about 1280 graphics cores may be sufficient. This is more than adequate to manage and utilize collected joint position data from the camera(s) 110. Recall that the cameras 110 are configured for the collection of non-point cloud data which renders this a practical undertaking for such a processor. More specifically, data collection, even where multiple cameras 110 are utilized across a worksite 125, is likely to run no more than a few hundred dollars of equipment cost in today's dollars. This is in sharp contrast to more sophisticated stereo depth and point cloud cameras which may be up to $10,000 a piece and require more sophisticated and more expensive processing means to manage the acquired data.

The described assembly 100 of FIG. 1 with workstation 201 of FIG. 2B is capable of estimating positions of dynamic obstacles from the joint position data. Thus, the system is able to evaluate changes for setting up or adjusting to a second or new motion plan for the robotic aids 160, 165 fast enough for the task(s) being performed without stopping. For example, with a joint estimation frequency of less than 15 Hz and an average motion planning frequency of less than about 60 Hz, the laborers 130, 140 should be able to perform tasks simultaneous with the robotic aids 160, 165 without concern over a robotic implement 167 or arm coming into contact with the moving laborers 130, 140. More specifically, the implement 167 may execute a task or motion, then change its motion path "on-the-fly" to adapt to a laborer 130, 140 getting in the way.

Referring now to FIG. 3, a side perspective view of a laborer 130 is shown collaborating with the robotic assembly implement 167 in finishing an article 190. In this embodiment, the simultaneousness of the tasks being performed by both the implement 167 and the laborer 130 are apparent. For example, the manufacturing process may require the cooperative nimble dexterity of the laborer 130 in combination with a particular refining tool of the implement 167 in completing the finished article for use and assembly such as for a smartphone component (by way of example, only). The risk of the implement 167 accidentally striking the laborer 130 during the process is substantially eliminated by the use of the collaborative assembly 100 of FIG. 1 as described hereinabove. That is, even without knowing precise movements of the laborer 130 in advance, the implement 167 may be directed by the workstation 201 to carry out a first movement plan for the task that may be adjusted to a second movement plan as needed based on collected real-time joint position data of the laborer 130. Of course, the process is continuous or dynamic in the sense that the second movement plan may later give way to another subsequent movement plan (e.g. a "third" movement plan) and so on.

For the described example of smartphone component assembly the risk to the laborer 130 may seem less than significant. However, when considering the precision required of the multiple tasks to complete such an article, the benefit of avoiding jarring accidental contact may be quite significant. Once more, embodiments of the assembly 100 of FIG. 1 may be utilized on a variety of different collaborative manufacturing applications. Thus, when considering that the tool of the implement 167 may be a larger or more hazardous finishing tool utilized along with the laborer 130 performing a smaller more precise finishing task at another portion of the article 190, more appreciable benefit may be realized.

Figure 4:
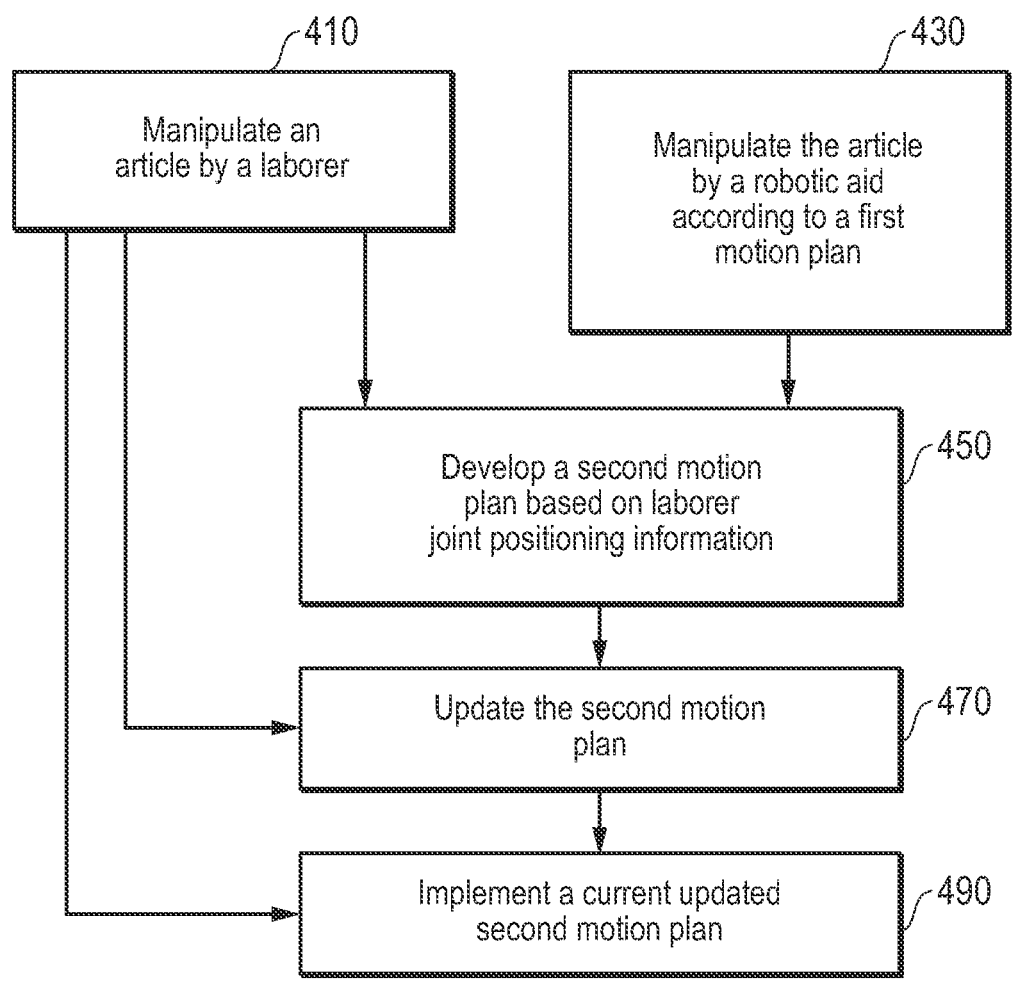
FIG. 4 is a flow-chart summarizing an embodiment of employing a collaborative robotic assembly safely facilitating human and robot tasks simultaneously on an article.

Referring now to FIG. 4, a flow-chart summarizing an embodiment of employing a collaborative robotic assembly is shown to facilitate efficient simultaneous human and robot tasks on an article. As indicated at 410, a laborer at the worksite may begin manipulating an article. As this proceeds, monitoring of the laborer takes place as described above. This may include markerless motion capture, markered motion capture or other types of visual monitoring including substantially continuous imaging. At the same time, the article may also be manipulated by a robotic aid according to a first motion plan that is directed by the workstation (see 430). While these collaborative tasks are being simultaneously performed, a second motion plan may be developed at the workstation and held in reserve based on laborer joint position information as noted at 450. Of course, with the continued performing of the task by the laborer, the second motion plan may require substantially continuous updating as indicated at 470. Further, as indicated at 490, where the processor of the workstation determines a likelihood of contact or a collision between the robotic aid and the laborer, the second motion plan for the robotic aid may be implemented in place of the initial motion plan. Thus, such contact may be avoided.

Figure 5:
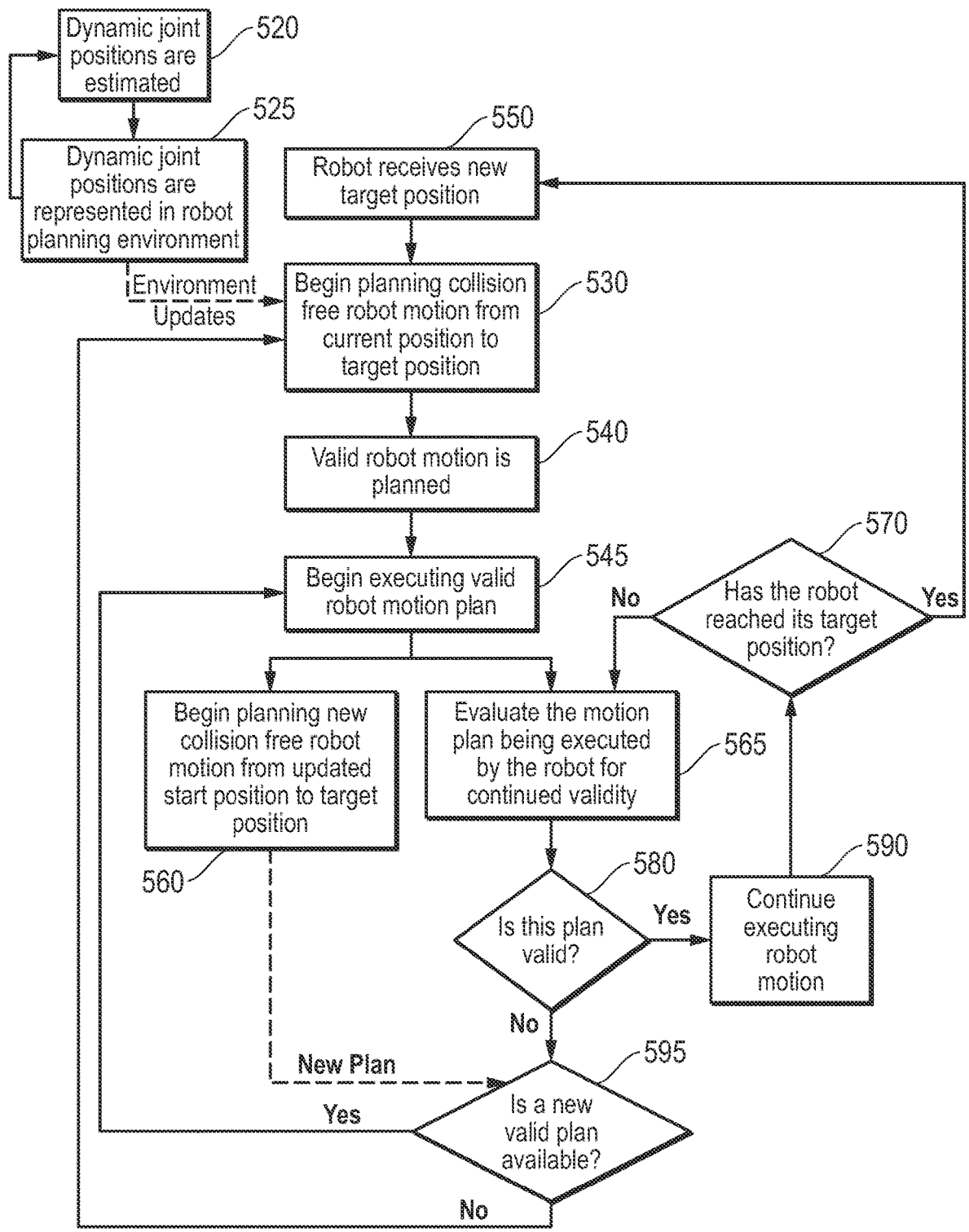
FIG. 5 is a more specifically detailed flow-chart summarizing an embodiment of collaborative tasks performed simultaneously on an article by both human and robotic implements.

FIG. 5 is a more specifically detailed flow-chart summarizing an embodiment of collaborative tasks performed simultaneously on an article by both human and robotic implements. For example, as a laborer begins a task, joint position estimates are established (see 520). These estimates are incorporated into a planning environment for the robotic aids as indicated at 535 and continuously updated. Thus, a first collision free motion plan may be developed (530), planned (540) and executed (545). At the same time, however, a new second motion plan may be developed as indicated at 560.

With the second motion plan developed, the first motion plan is continuously evaluated for validity in terms of collision-free movement (see 565). If the plan is valid as indicated at 580, continued execution will take place as indicated at 590. However, if the first plan is no longer valid, a new valid plan will be executed as indicated at 595 if available. Of course, if a second motion plan is not available, a pause will occur as another second motion plan is developed (see 530). At some point, the robotic aid may reach its target or task position to perform the task at hand (see 570). Thus, once complete, a new target or task will be in store (see 550).

Such a system and method may be feasible with voluminous point cloud data and industrial speed processors. However, it is worth noting that for embodiments described here, a non-point cloud data acquisition camera and a mid-tier consumer grade workstation may be more than sufficient to achieve the level of collaborative, collision-free, robotic-human laborer co-working described herein.

Embodiments described above provide a cost effective manner of implementing a truly collaborative system for manufacturing that employs simultaneous robotic and human laborer interactions. This is achieved without the requirement of high data acquisition point cloud or depth cameras or industrial grade processors. As a result, inefficient segregated caging off of robotic aids or avoidance of article processing by laborer and robotic aid at the same time are not required. Thus, a cost-effective, truly collaborative system is provided.

The preceding description has been presented with reference to presently preferred embodiments. Persons skilled in the art and technology to which these embodiments pertain will appreciate that alterations and changes in the described structures and methods of operation may be practiced without meaningfully departing from the principle and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. A robotic system for collaborative operation with a laborer at a worksite, the system comprising:
   at least one non-point cloud 2D camera to acquire human joint visual data of the laborer at the worksite at a frequency of less than 15 Hz;
   a movable robotic aid to facilitate a first task at the worksite according to a first motion plan, the first task different from a second task facilitated by the laborer at the worksite; and
   a workstation with a processor to direct the robotic aid according to the first motion plan and to attain the visual data in substantially real-time, the processor to develop and adjust an adoptable second motion plan for the first task during the directing and the attaining based on prestored human joint positioning during the tasks, and wherein the processor is operable is limited to operation with less than one of 10 computing cores and 1280 graphics cores at a frequency of no more than 60 Hz.

2. The robotic system of claim 1 wherein the robotic aid includes an implement with a finishing tool for the first task.

3. The robotic system of claim 1 wherein the processor is one of a commercially available laptop computer.

4. The robotic system of claim 1 wherein the camera includes a sensor.

5. The robotic system of claim 1 wherein the camera is one of a 2D motion camera and a 3D motion camera.

6. A worksite facility for assembling an article of manufacture, the facility accommodating:
   at least one mounted non-depth 2D camera to acquire human joint position data of at least one human laborer at the facility at a frequency of less than 15 Hz;
   a movable robotic aid to facilitate a first task at the worksite according to a first motion plan, the first task different from a second task facilitated by the laborer at the facility; and
   a workstation with a processor to direct the robotic aid according to the first motion plan and to attain the human joint position data in substantially real-time, the processor to develop and adjust an adoptable second motion plan for the first task during the directing and the attaining based on prestored human joint position data during the tasks, and wherein the processor is limited to operating with less than one of 10 computing cores and 1280 graphics cores at a frequency of no more than 60 Hz.

7. The worksite facility of claim 6 wherein the article of manufacture is manipulated by the laborer and the robotic aid simultaneously.

8. The worksite facility of claim 6 wherein the robotic aid is a mobile robotic aid.

9. A method of collaborative interaction between a human laborer and a robotic aid at a worksite, the method comprising:

manipulating an article of manufacture by the laborer;
manipulating the article by the robotic aid according to a first motion plan;
developing a second motion plan for the robotic aid based on prestored human laborer joint positioning information acquired from a 2D non-point cloud camera at a frequency of less than 15 Hz; and
implementing the second motion plan with a processor of a workstation, wherein the processor is limited to operating with less than one of 10 computing cores and 1280 graphics cores at a frequency of less than 60 Hz.

10. The method of claim 9 further comprising updating the second motion plan based on joint positioning data in advance of the implementing thereof.

11. The method of claim 9 wherein the manipulating by the laborer and the manipulating by the robotic aid are simultaneous.

12. The method of claim 9 wherein the non-point cloud camera is configured for substantially continuous imaging.

13. The method of claim 12 wherein the non-point cloud camera is a first non-point cloud camera, the method further comprising employing another non-point cloud camera to acquire depth information.

14. The method of claim 9 further comprising ceasing the manipulating by the robotic aid in advance of the developing of the second motion plan.

15. The method of claim 9 further comprising implementing another motion plan for the robotic aid following completion of one of the first and second motion plans.

* * * * *